Figure 2:
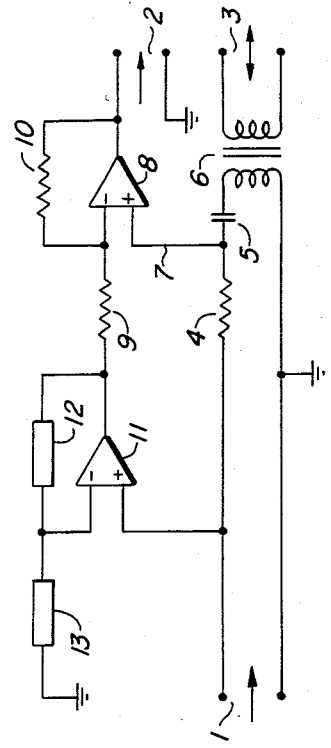

United States Patent [19]

Murto

[11] Patent Number: 4,500,755
[45] Date of Patent: Feb. 19, 1985

[54] ELECTRIC HYBRID CIRCUITS

[75] Inventor: Tapio H. Murto, Nepean, Canada

[73] Assignee: Northern Telecom Limited, Montreal, Canada

[21] Appl. No.: 323,540

[22] Filed: Nov. 20, 1981

[51] Int. Cl.³ .............................................. H04B 1/58
[52] U.S. Cl. ............................ 179/170 NC; 179/81 A
[58] Field of Search .......... 179/81 B, 170 T, 170 NC, 179/81 A; 370/32, 28

[56] References Cited

U.S. PATENT DOCUMENTS

| | | | |
|---|---|---|---|
| 2,629,024 | 2/1953 | Edwards | 179/170 NC |
| 3,970,805 | 7/1976 | Thomas | 179/170 NC |
| 4,163,878 | 8/1979 | Hashemi | 179/170 NC |
| 4,203,005 | 5/1980 | Fukuda et al. | 179/18 BC |
| 4,292,479 | 9/1981 | Chataignon et al. | 179/170 NC |

FOREIGN PATENT DOCUMENTS

| | | | |
|---|---|---|---|
| 100211 | 8/1979 | Japan | 179/170 NC |
| 115401 | 9/1981 | Japan | 179/170 NC |
| 1124351 | 8/1968 | United Kingdom | 179/170 NC |

*Primary Examiner*—Gene Z. Rubinson
*Assistant Examiner*—Randall P. Myers
*Attorney, Agent, or Firm*—R. John Haley

[57] ABSTRACT

A hybrid circuit has its 4-wire path input coupled via a resistor to a 2-wire port and a non-inverting input of a differential amplifier, and via an active stage and another resistor to an inverting input of the differential amplifier, whose output is coupled to a 4-wire path output of the circuit and via a resistor to the inverting input. The active stage includes impedances, constituting a feedback arrangement or an input potential divider arrangement of an amplifier, which enable the hybrid circuit sidetone to be controlled or made substantially zero, without affecting the circuit's receive gain, even when the circuit is connected to a 2-wire path having a complex impedance.

9 Claims, 4 Drawing Figures

ELECTRIC HYBRID CIRCUITS

This invention relates to electronic hybrid circuits.

Various forms of electronic hybrid circuit, comprising an input port and an output port for connection to a 4-wire transmission path and an input/output port for connection to a 2-wire transmission path, are known. Typically the 2-wire transmission path is a telephone subscriber loop, which has a complex impedance which can be anywhere within a wide range.

It is desirable to provide a hybrid circuit in which signal transmission from the input port to the output port, called the sidetone, is controlled to be at a desired level or is made substantially zero. However, it is also desirable for the hybrid circuit to be relatively simple in design and cheap to manufacture. Furthermore, it is desirable for the hybrid circuit to have a so-called receive gain, for signal transmission from the input/output port to the output port, which is predetermined and independent of frequency. These desiderata are difficult to satisfy for hybrid circuits which are to be connected to 2-wire transmission paths, such as telephone subscriber loops, of widely variable and complex impedance.

Accordingly, an object of this invention is to provide an electronic hybrid circuit, for connection to 2-wire transmission paths such as telephone subscriber loops, which facilitates achieving a substantially zero or controlled sidetone and constant receive gain.

According to this invention there is provided an electronic hybrid circuit comprising: an input port and an output port for connection to a 4-wire path; a differential amplifier having an inverting input, a non-inverting input and an output coupled to the output port; a first resistor coupled between the output and the inverting input of the differential amplifier; a second resistor coupled between the input port and the non-inverting input of the differential amplifier; means for coupling a 2-wire path to a junction between the second resistor and the non-inverting input of the differential amplifier; an active stage having an input, coupled to the input port, and an output; and the third resistor coupled between the output of the active stage and the inverting input of the differential amplifier; the active stage including amplifying means and impedance means for compensating for the impedance of a 2-wire path whereby the level of signals transmitted from the input port to the output port is controlled.

Thus in contrast to a prior art hybrid circuit in which the input port is connected via respective resistors to the inverting and non-inverting inputs of a differential amplifier whose output is coupled to the output port, the input/output port being coupled to the non-inverting input of the differential amplifier, in accordance with the invention an additional active stage is provided in the sidetone cancellation path from the input port to the differential amplifier. The characteristics of this additional active stage can be varied to achieve a a controlled level of, for example substantially zero, sidetone without affecting the receive gain via the differential amplifier stage. At the same time, the provision of the extra active stage does not unduly complicate the hybrid circuit or make it unduly expensive to manufacture.

The impedance means can constitute a negative feedback arrangement for the amplifying means, or a potential divider arrangement between the input port and the amplifying means.

In one embodiment of the invention the active stage comprises a differential amplifier constituting said amplifying means and having an inverting input, a non-inverting input coupled to the input port, and an output constituting the output of the active stage; a first impedance coupled between the output and the inverting input of the differential amplifier; and a second impedance coupled between the inverting input of the differential amplifier and a reference potential, the first and second impedances constituting said impedance means.

In a preferred embodiment the active stage comprises a differential amplifier constituting said amplifying means and having an inverting input, a non-inverting input, and an output constituting the output of the active stage and coupled to the inverting input of the differential amplifier via a feedback path; a first impedance coupled between the input port and the non-inverting input of the differential amplifier; and a second impedance coupled between the non-inverting input of the differential amplifier and a reference potential, the first and second impedances constituting said impedance means.

Conveniently the second impedance comprises a resistor and a capacitor connected in series.

The means for coupling the 2-wire path may comprise a transformer coupled to the 2-wire path and a capacitor coupled between the transformer and said junction between the second resistor and the non-inverting input of the differential amplifier.

Figure 1:
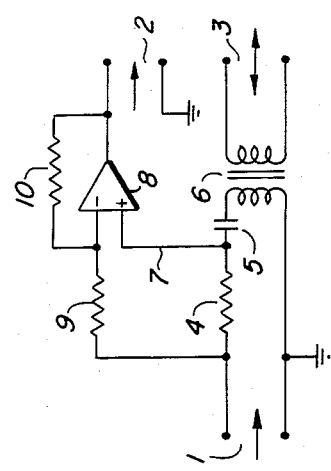

The invention will be further understood from the following description with reference to the accompanying drawings, in which:

FIG. 1 illustrates a known electronic hybrid circuit; and

Figure 4:
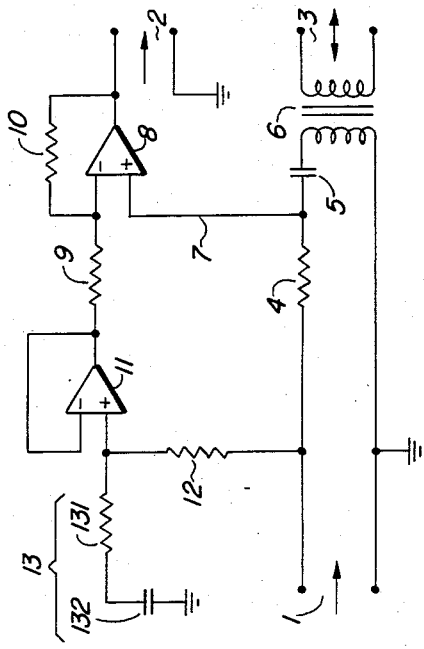
Figure 3:
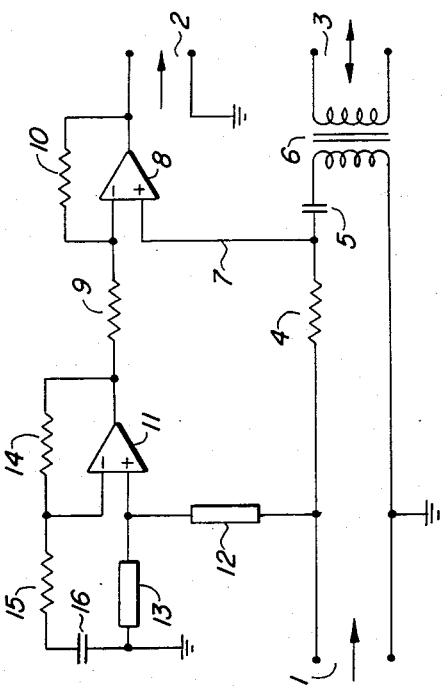

FIGS. 2 to 4 each illustrate an electronic hybrid circuit in accordance with the invention.

The same references are used in the different figures to denote similar components.

Referring to FIG. 1, a known electronic hybrid circuit has a 4-wire input port 1 and output port 2, and a balanced 2-wire input/output port 3 which in use is connected, for example, to a telephone line (not shown). Signals at the input port 1 are coupled to the 2-wire port 3 via a resistor 4, a coupling capacitor 5, and a transformer 6. Signals incoming at the 2-wire port 3 are coupled to the output port 2 via the transformer 6, the capacitor 5, a wire 7, and a differential amplifier 8 to the non-inverting input of which the wire 7 is connected.

In order to compensate for signals which are supplied from the input port 1 to the amplifier 8 via the resistor 4 and the wire 7, the input port 1 is also coupled to the inverting input of the amplifier 8 via a resistor 9. The amplifier has a gain which is determined by the resistance R1 of the resistor 10, connected between the output of the amplifier 9 and its inverting input, and the resistance R2 of the resistor 9. The receive gain Gr, for signals incoming at the 2-wire port 3, of the hybrid circuit is $1+(R1/R2)$. For example if $R1=51$ k$\Omega$ and $R2=2.7$ k$\Omega$, then $Gr \simeq 20$.

The resistance R3 of the resistor 4 is selected to provide a matched termination for the telephone line connected to the 2-wire port 3. Typically $R3=560^{106}$. If the reflected impedance of the telephone line at the junction between the resistor 4 and the capacitor 5 is Z, then the transmit gain Gt, for signals incoming at the input port 1, of the hybrid circuit is $Z/(Z+R3)$.

In order for the hybrid circuit to transmit no signals from its input port 1 to its output port 2, i.e. to have zero sidetone as may be desired, it is required that $Gt.Gr - R1/R2 = 0$. However, the transmit gain Gt is dependent upon the impedance Z, which is generally a complex impedance which may vary within a wide range depending upon the particular telephone lines to which the hybrid circuit is connected. Thus using the resistors 9 and 10 the sidetone (signal transmission from the input port 1 to the output port 2) can not be reduced to zero in this simple arrangement. One or both of the resistors 9 and 10 could be replaced by complex impedances to reduce the sidetone, but this would make the receive gain Gr dependent on frequency which is not desired.

In order to permit the sidetone to be substantially eliminated without affecting the receive gain Gr, an additional active stage is provided in the path between the input port 1 and the resistor 9. Each of FIGS. 2 to 4 shows a respective form of this additional stage, but is otherwise the same as FIG. 1. Accordingly the above description of the elements 1 to 10 which are shown in all of the figures is not repeated below.

Referring to FIG. 2, the additional stage in this case comprises a differential amplifier 11 and two impedances 12 and 13 having impedances Z1 and Z2 respectively, either or both of which may be complex. The amplifier 11 has its non-inverting input connected to the input port 1 and its output connected to the resistor 9 and also coupled via the impedance 12 to its inverting input, which is coupled to circuit ground via the impedance 13. Thus the impedances 12 and 13 constitute a negative feedback arrangement for the amplifier 11, which provides a gain of $1 + (Z1/Z2)$.

In the hybrid circuit of FIG. 2, the receive gain Gr and the transmit gain Gt are the same as in the circuit of FIG. 1, whereas the gain from the input port 1 to the output port 2 via the amplifiers 11 and 8 is $[1 + (Z1/Z2)].(-R1/R2)$. Thus for zero sidetone it is required that $[Z/(Z+R3)].[1 + (R1/R2)] - [1 + (Z1/Z2)].R1/R2 = 0$. With this circuit, therefore, it can be seen that the sidetone can be made substantially zero independently of the desired receive gain Gr, by appropriate selection of the impedances Z1 and Z2 in relation to the impedance Z and the resistance R3. For example if $GR \geq 20$, then $1 + (R1/R2)$ is approximately the same as R1/R2, so that the sidetone is substantially zero if $Z/(Z+R3) = 1 + (Z1/Z2)$. This equation can be satisfied by appropriate selection of the impedances 12 (Z1) and 13 (Z2).

Satisfying the above equation may, however, involve the use of inductors in one or both of the impedances. The use of inductors is not generally desired. Accordingly, in the more preferred hybrid circuit shown in FIG. 3 the additional stage comprising the differential amplifier 11 is arranged differently. In this case the input port 1 is coupled to the non-inverting input of the amplifier 11 via the impedance 12 (Z1), and this amplifier input is coupled to circuit ground via the impedance 13 (Z2). Thus the impedances 12 and 13 constitute a potential divider arrangement between the input port 1 and the amplifier 11. The output of the amplifier is connected to the resistor 9 and is coupled via a resistor 14 of resistance R4 to the inverting input of the amplifier, which input is coupled to circuit ground via a resistor 15 of resistance R5 and a capacitor 16.

In the circuit of FIG. 3 the receive gain Gr and the transmit gain Gt are the same as in the circuit of FIG. 1, whereas the gain from the input port 1 to the output port 2 via the amplifiers 11 and 8 is $[Z2/(Z1+Z2)].[1+(R4/R5)].(-R1/R2)$. Thus for zero sidetone it is required that $[Z/(Z+R3)].[1+(R1/R2)] - [Z2/(Z1+Z2)].[1+(R4/R5)].R1/R2 = 0$. Again in this case, the sidetone can be made substantially zero independently of the receive gain, but the impedances Z1 and Z2 can be more conveniently constituted by a resistor, and a resistor and a capacitor in series, respectively.

For example, it is assumed that the receive gain $Gr = 2$, so that $R1/R2 = 1$, and that $R4/R5 = 1$. Then the above equation for zero sidetone in the circuit of FIG. 3 becomes $Z/(Z+R3) = Z2/(Z1+Z2)$. This equation is readily satisfied by making $Z2 = Z$ and $Z1 = R3$. Thus the sidetone is readily made zero; any unbalance of the circuit resulting in a non-zero sidetone can only be due to tolerances of the circuit components.

For large receive gains for which $1 + (R1/R2)$ is approximately the same as R1/R2, the circuit of FIG. 3 can be simplified to that of FIG. 4, in which the components 14, 15, and 16 of FIG. 3 are replaced by a direct connection between the output and the inverting input of the amplifier 11. As shown in FIG. 4, the impedance 12 (Z1) is purely resistive, and the impedance 13 (Z2) is constituted by a resistor 131 connected in series with a capacitor 132. Again in this circuit the sidetone is substantially zero when $Z2 = Z$ and $Z1 = R3$.

By way of further example, it is noted that if the telephone line connected to the 2-wire port 3 is a 26 AWG telephone line 8000 feet long having a nominal impedance of 600Ω producing a reflected impedance Z of $975 - j475\Omega$, then for balancing at a frequency of 2 kHz the various components in FIGS. 3 and 4 could have the following values:

| Component | Impedance | Value |
| --- | --- | --- |
| 4 | R3 | 600Ω |
| 5 | | 10 μF |
| 9 | R2 | 51 kΩ (Gr = 2, FIG. 3) |
| | | 2.7 kΩ (Gr = 20, FIG. 4) |
| 10 | R1 | 51 kΩ |
| 12 | Z1 | 600Ω |
| 13 | Z2 | 975Ω in series with 167 nF |
| 14 | R4 | 51 kΩ |
| 15 | R5 | 51 kΩ |
| 16 | | 0.1 μF |

Although the impedances 12 and 13, and the various resistors in the circuits of FIGS. 2 to 4, have been described and illustrated as being fixed-value components, these may be made variable, in particular in order to facilitate balancing of the hybrid circuit for different telephone lines connected to the 2-wire port 3. If a greater receive gain is required without increasing the gain of the amplifier 8, this can be provided in any of the circuits of FIGS. 2 to 4 by incorporating an amplifier stage in the wire 7 and correspondingly changing the gain via the amplifier 11, or by providing a further amplifier stage following the amplifier 8. Furthermore, although the circuits have been described above in relation to achieving substantially zero sidetone, it should be appreciated that the circuits may equally be used, with appropriate changes in impedance magnitudes, to provide any desired controlled level of sidetone.

Numerous other modifications, variations, and adaptations may be made to the described circuits without departing from the scope of the invention, which is defined in the claims.

What is claimed is:

1. An electronic hybrid circuit comprising:
    an input port and an output port for connection to a 4-wire path;
    a differential amplifier having an inverting input, a non-inverting input and an output coupled to the output port;
    a first resistor coupled between the output and the inverting input of the differential amplifier;
    a second resistor coupled between the input port and the non-inverting input of the differential amplifier;
    means for coupling a 2-wire path to a junction between the second resistor and the non-inverting input of the differential amplifier;
    an active state having an input, coupled to the input port, and an output; and
    a third resistor coupled between the output of the active stage and the inverting input of the differential amplifier;
    the active stage including amplifying means and impedance means for compensating for the impedance of the 2-wire path whereby the level of signals transmitted from the input port to the output port is controlled.

2. A circuit as claimed in claim 1 wherein the impedance means constitutes a negative feedback arrangement for the amplifying means.

3. A circuit as claimed in claim 1 wherein the active stage comprises a differential amplifier constituting said amplifying means and having an inverting input, a non-inverting input coupled to the input port, and an output constituting the output of the active stage; a first impedance coupled between the output and the inverting input of the differential amplifier; and a second impedance coupled between the inverting input of the differential amplifier and a reference potential, the first and second impedances constituting said impedance means.

4. A circuit as claimed in claim 1 wherein the impedance means constitutes a potential divider arrangement between the input port and the amplifying means.

5. A circuit as claimed in claim 1 wherein the active stage comprises a differential amplifier constituting said amplifying means and having an inverting input, a non-inverting input, and an output constituting the output of the active stage and coupled to the inverting input of the differential amplifier via a feedback path; a first impedance coupled between the input port and the non-inverting input of the differential amplifier; and a second impedance coupled between the non-inverting input of the differential amplifier and a reference potential, the first and second impedances constituting said impedance means.

6. A circuit as claimed in claim 5 wherein the second impedance comprises a resistor and a capacitor connected in series.

7. A circuit as claimed in claim 1, 3, or 5 wherein the means for coupling the 2-wire path comprises a transformer coupled to the 2-wire path and a capacitor coupled between the transformer and said junction between the second resistor and the non-inverting input of the differential amplifier.

8. A circuit as claimed in claim 1, 2, or 3 wherein said impedance means is selected so that substantially no signals are transmitted from the input port to the output port.

9. A circuit as claimed in claim 4, 5, or 6 wherein said impedance means is selected so that substantially no signals are transmitted from the input port to the output port.

* * * * *